United States Patent [19]
Horichi et al.

[11] 3,763,382
[45] Oct. 2, 1973

[54] AMPLITUDE CONTROL CIRCUIT

[75] Inventors: Tetsuya Horichi; Yoshitaka Kanemoto, both of Tokyo, Japan

[73] Assignee: Sony Corporation, Tokyo, Japan

[22] Filed: Mar. 1, 1972

[21] Appl. No.: 230,765

[30] Foreign Application Priority Data

Feb. 25, 1971 Japan ............................. 46/11554

[52] U.S. Cl. ................ 307/264, 307/237, 307/304, 328/171, 328/172, 330/29, 330/145

[51] Int. Cl. ....... H03k 5/08, H03b 3/02, H03g 3/20

[58] Field of Search ................... 307/237, 239, 240, 307/251, 264, 255, 304, 297; 328/168, 169, 171, 172, 173; 323/8, 21; 330/29, 144, 145

[56] References Cited

UNITED STATES PATENTS

| | | | |
|---|---|---|---|
| 2,772,388 | 11/1956 | Erath et al. | 330/29 X |
| 3,621,284 | 11/1971 | Cluett et al. | 307/237 |
| 3,560,768 | 2/1971 | Rimkus | 307/264 |
| 2,888,636 | 5/1959 | McManis | 328/171 |
| 3,117,287 | 1/1964 | Damico | 330/29 X |
| 3,246,080 | 4/1966 | Ritchey, Jr. | 307/237 X |
| 3,311,837 | 3/1967 | Moreines | 307/237 X |
| 3,412,340 | 11/1968 | Chao | 330/29 |
| 3,497,721 | 2/1970 | Dexter | 307/237 |
| 3,502,903 | 3/1970 | Wade | 307/237 X |
| 3,582,681 | 6/1971 | Norman et al. | 307/237 |
| 3,657,567 | 4/1972 | Brander | 307/237 X |
| 3,688,129 | 8/1972 | Ishigaki et al. | 307/270 X |
| 3,693,029 | 9/1972 | Niven, Jr. | 307/237 |

FOREIGN PATENTS OR APPLICATIONS

| | | | |
|---|---|---|---|
| 1,803,655 | 6/1970 | Germany | 330/29 |
| 218,724 | 1/1957 | Australia | 328/169 |

OTHER PUBLICATIONS

Hannan, "A Keyed D.C. Restorer for Transistor Circuits," RCA Tech. Notes, TN No. 381, 6–1960, Sheets 1 & 2 of 2.

Hunter, Handbook of Semiconductor Electronics, p. 15–21 to 15–27 & 15–48, McGraw-Hill Book Co. 3rd Ed. 1970.

Desblache, "Proportional Limiting Device," IBM Tech. Discl. Bull., Vol. 10, No. 9, p. 1426–1427, 2–1968.

*Primary Examiner*—John S. Heyman
*Assistant Examiner*—L. N. Anagnos
*Attorney*—Lewis H. Eslinger et al.

[57] ABSTRACT

A signal amplitude control circuit having a main signal transmission path and a shunt path comprising a variable impedance circuit having a plurality of series connected semiconductor elements whose impedances are varied by changing their biasing conditions in response to a control signal.

10 Claims, 10 Drawing Figures

PATENTED OCT 2 1973

3,763,382

AMPLITUDE CONTROL CIRCUIT

BACKGROUND OF THE INVENTION

The invention relates to a signal amplitude control circuit, and more particularly to an improved signal amplitude control circuit employing a variable impedance shunt circuit.

It is sometimes necessary to control the amplitude of signals passing through a transmitting line in response to a control signal. For example in some cases it is necessary to have a constant output signal irrespective of amplitude variations in the input signal to the transmitting line.

Some prior control systems utilize a portion of the output signal to control a variable impedance shunt path. The impedance of the shunt path is varied in response to changes in the control signal. In most conventional circuits of this type, however, not only is the amplitude of the output signal varied by its D.C. level is also varied by changes in the impedance of the shunt path. A further drawback is that the amplitude of the output signal is sometimes distorted due to non-linear variations of the impedance of the shunt path in response to the control signal.

SUMMARY OF THE INVENTION

The above and other disadvantages are overcome by the present invention which comprises an amplitude control circuit including a signal transmission path having input and output terminals and a circuit ground and a variable impedance shunt path connected between the input and output terminals of the transmission path and the circuit ground. The shunt path circuit varies its impedance in response to a control signal and includes a first semiconductor device having first, second and third electrodes, a DC power source having one terminal connected to the circuit ground and the other terminal connected in series with a first resistor to the first electrode of the first semiconductor device. A second resistor is connected between the second electrode of the first semiconductor device and the circuit ground. A plurality of other semiconductor devices are connected in series between the first and the second electrodes of the first semiconductor device. Each of the series connected semiconductor devices has a junction of P-type and N-type semiconductor regions therein with the P-type region of one of the semiconductor devices being connected to the N-type region of the next semiconductor device.

The signal transmission path is connected between its input and output terminals to a junction point between the series connected semiconductor devices. A control signal is supplied to the third electrode of the first semiconductor device to selectively saturate or unsaturate the first semiconductor device in response to variations in the control signal and thereby cause the bias across the junctions of the series connected semiconductor devices to be changed. The change in bias across the semiconductor junctions changes their impedances.

In one preferred embodiment the first semiconductor device is a transistor and the series connected semiconductor devices are semiconductor diodes connected with the same direction of polarity between the emitter and collector leads of the transistor. In other embodiments the junctions of series connected transistors comprise the series connected semiconductor devices.

In the operation of one preferred embodiment, when no control signal is applied to the third electrode of the first semiconductor device it is biased to be in saturation so that the voltage potential between its first and second electrodes is so small that it may be neglected. The potential of both the first and second electrodes with respect to the circuit ground is substantially equal to one-half of the voltage of the DC power source because the resistive elements constitute a voltage divider network and they are chosen to be of equal value. This voltage level causes the series connected semiconductive devices to be reverse biased and hence they are in a very high impedance condition with respect to the signal to be shunted. A signal applied to the input terminal of the transmission path is therefore not shunted by the variable impedance circuit and passes substantially unaltered to the output terminals of the signal transmission path.

When a control signal is supplied to raise the potential of the third electrode of the first semiconductor device, the current flowing between its first and second electrodes decreases with the result that the first electrode becomes higher in potential than the second electrode. This voltage potential between the first and second electrodes causes the series connected semiconductive devices to become forwardly biased and to lower their impedances. A greater proportion of the signal from the signal transmission path is then shunted to the circuit ground with the result that the signal appearing at the output terminal of the signal transmission path is decreased in amplitude.

Since the resistive elements have equal resistive values and because the series connected semiconductive devices are selected to have substantially equal characteristics the point where the variable impedance shunt circuit is connected to the transmission path will always have a direct current potential with respect to the circuit ground substantially equal to one-half of the voltage of the DC power source. This potential will remain constant irrespective of variations in the control signal applied to the third electrode of the first semiconductor device. Therefore the DC level of the signal appearing at the output terminal of the signal transmission path is free from fluctuation even though its amplitude is varied in response to variations in the control signal. With respect to the signal to be shunted the series connected semiconductive devices are connected essentially in parallel and with opposite poarities and therefore any non-linear impedance characteristics of the semiconductive devices tend to cancel each other. This reduces distortion in the signal which is to be amplitude controlled.

Accordingly, it is an object of the invention to provide an amplitude control circuit employing a variable impedance shunt circuit responsive to a control signal.

It is another object of the invention to provide an amplitude control circuit employing a variable impedance circuit which does not cause variations in the DC level of the signal to be controlled.

The foregoing and other objectives, features, and advantages of the invention will be more readily understood upon consideration of the following detailed description of certain preferred embodiments of the invention, taken in conjunction with the accompanying drawings.

DESCRIPTION OF CERTAIN PREFERRED EMBODIMENTS

Figure 1:
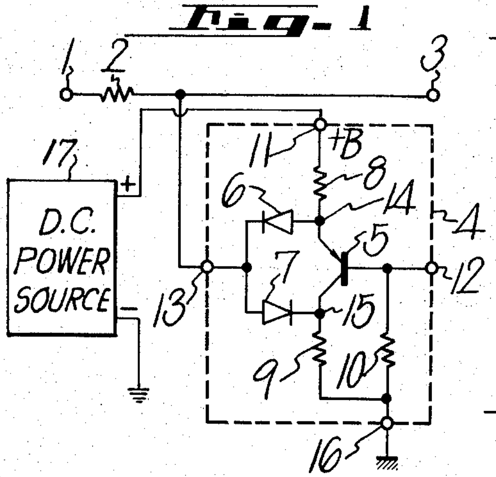
FIG. 1 is a schematic diagram of one embodiment of the invention.
Figure 2:
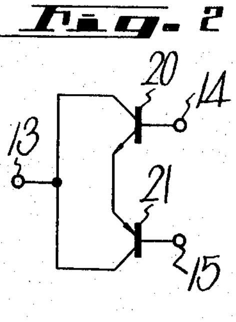
FIGS. 2 through 9, inclusive, are schematic diagrams of the series connected semiconductor devices of other embodiments of the invention for use in the embodiment of FIG. 1.

Referring now to FIG. 1 a principal embodiment of the amplitude control circuit of the invention comprises a signal transmission path having an input terminal 1 connected in series with a resistor 2 to an output terminal 3. A variable impedance shunt circuit 4 is connected between the output terminal 3 and a circuit ground 16.

The variable impedance shunt circuit 4 includes a PNP transistor 5 having its emitter electrode connected in series through a resistor 8 to the positive terminal of a DC power source 17. The collector electrode of the transistor 5 is connected through a resistor 9, of the same value as the resistor 8, to the circuit ground 16. The negative terminal of the DC power source 17 is also connected to the circuit ground 16. The base electrode of the transistor 5 is connected to a control signal input terminal 12. A resistor 10 is connected between the base of the electrode 5 and the circuit ground 16. The values of the resistors 8, 9 and 10 are selected to bias the transistor 5 such that in the absence of a control signal at terminal 12 a saturation current flows between its emitter and collector electrodes.

The anode of a semiconductor diode 6 is connected to the emitter electrode of the transistor 5 and the cathode of the diode 6 is connected to a terminal 13. Another semiconductor diode 7, having characteristics substantially identical to those of the semiconductor diode 6, has its anode connected to the terminal 13 and its cathode connected to the collector electrode of the transistor 5. The terminal 13 is connected to the output terminal 3.

For reference purposes the common connection point of the anode of the diode 6, the emitter electrode of the transistor 5 and one end of the resistor 8 is designated as 14. The common connection point of the collector electrode of the transistor 5, one end of the resistor 9 and the cathode of the diode 7 is designated as 15. The connection point between the resistor 8 and the positive terminal of the DC power source 17 is designated 11.

In the absence of a control signal the transistor 5 is in a saturated condition and the points 14 and 15 are at substantially the same potential with respect to ground, namely, they are at a potential which is approximately one-half of the potential of the direct current power source 17. This is a result of the voltage divider network between terminals 11 and 16 comprised of the resistors 8 and 9. With this potential at the points 14 and 15 the diodes 6 and 7 are reverse biased and hence have a very high impedance with respect to a signal impressed on terminal 13. Thus very little of the signal passing between terminals 1 and 3 is shunted to the circuit ground through the variable impedance shunt circuit 4.

When a positive control signal is supplied to the input terminal 12 of the variable impedance circuit 4, the base potential of the transistor 5 increases which causes the current flowing through the emitter-collector junction of the transistor 5 to decrease. This causes the potential with respect to ground of the point 14 to become higher than one-half of the output voltage of the DC power source 17 and the potential with respect to ground of the point 15 to become less than one-half the voltage of the DC power source 17. The diodes 6 and 7 then become forwardly biased and their impedances are lowered.

With respect to a signal impressed on the terminal 13 the variable impedance circuit 4 now provides a low impedance shunt path which drains off a portion of the signal passing between the terminals 1 and 3. Since the variable impedance circuit 4 and the resistor 2 form a voltage divider network, this results in a decrease in amplitude in the signal appearing at the output terminal 3. The impedances of the diodes 6 and 7 change in accordance with the level of the control signal supplied to the input terminal 12 and therefore the amount of the signal shunted from the signal transmission path is also changed in response to the level of the control signal.

The direct current potential appearing at terminal 13 is substantially one-half the voltage of the DC power source 17 irrespective of changes in the voltage impressed on the connection points 14 and 15 since the diodes 6 and 7 are selected to have the same characteristics. Thus the direct current potential of the signal appearing at the output terminal 3 does not fluctuate with changes in its amplitude caused by variations in the impedance of the circuit 4. Furthermore since the diodes 6 and 7 are connected with opposite polarities with respect to the signal to be shunted the distortions which might be caused by non-linear characteristics in their impedance variations are cancelling and the signal passing from the output terminal 3 is not subject to amplitude distortion.

In the embodiments depicted in FIGS. 2–9, inclusive, various semiconductor circuits are substituted for the semiconductor diodes 6 and 7 in the embodiment of FIG. 1. It should be understood in reference to the embodiments of FIGS. 2–9, inclusive, that the reference numerals 12, 13, 14, 15 and 16 refer to the designated points in the embodiment of FIG. 1 and that the diodes 6 and 7 are omitted. In reference now particularly to FIG. 2 a transistor 20 has its base connected to the terminal 14, its collector electrode connected to the terminal 13 and its emitter electrode connected to the emitter electrode of a transistor 21. The transistor 20 is an NPN transistor whereas the transistor 21 is a PNP transistor. The collector electrode of the transistor 21 is connected to the terminal 13 and its base electrode is connected to the terminal 15. The transistors 20 and 21 operate substantially in the same manner as the diodes 6 and 7.

Thus when no control signal is applied to the terminal 12 the bases of the transistors 20 and 21 are at substantially the same potential namely, one-half of the voltage supplied by the DC power source 17. In this condition the transistors 20 and 21 are reversed biased and essentially non-conducting with respect to the shunt signal appearing at the terminal 13. When the control signal is applied to terminal 12 to cause the transistor 5 to become essentially non-conducting then the terminal 14 is raised to a higher potential than the terminal 15 and the transistors 20 and 21 become conducting. In this state they are forward biased and the shunt signal appearing at terminal 13 is conducted to the circuit ground through the transistors 20 and 21 in essentially the same manner as it was conducted to the circuit ground through the diodes 6 and 7 in the embodiment of FIG. 1.

Figure 3:
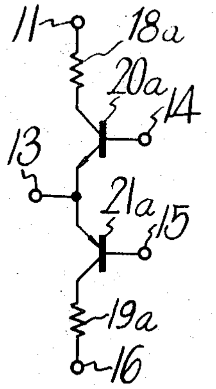

Referring now to FIG. 3 the base of an NPN transistor 20*a* is connected to terminal 14. The collector electrode of transistor 20*a* is connected through a resistor 18*a* to the terminal 11 of the embodiment of FIG. 1 and the emitter electrode of the transistor 20*a* is connected to the terminal 13. The emitter electrode of a PNP transistor 21a is also connected to the terminal 13 and the base electrode of the transistor 21*a* is connected to the terminal 15. The collector electrode of the transistor 21*a* is connected through a resistor 19*a* to the circuit ground 16.

When no control signal is applied to the base of the transistor 5 through the input terminal 12 the transistor 5 is in saturation and the terminals 14 and 15 are at equal potential. This causes the transistors 20a and 21a to be reversed biased and essentially non-conducting. They thus present a high impedance path to the signal to be shunted. When a control signal is applied to the input terminal 12, thereby shutting off the transistor 5, and establishing a voltage potential between the terminals 14 and 15 the transistors 20*a* and 21*a* are put into a conducting state. In this conducting state they present a low impedance path between the terminal 13 and the circuit ground 16 and thus shunt a portion of the signal transmitted between terminal 1 and terminal 3 to the circuit ground.

Figure 4:
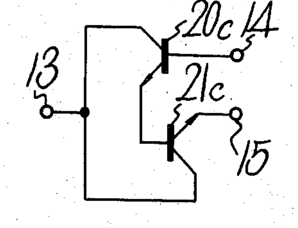

Referring now more particularly to FIG. 4 another portion of an embodiment according to the invention for use in a circuit depicted in FIG. 1 is shown comprising an NPN transistor 20*c* having its collector electrode connected to the terminal 13 and its base electrode connected to the terminal 14. The emitter electrode of the transistor 20*c* is connected directly to the base electrode of a PNP transistor 21*c*. The emitter electrode of the transistor 21c is connected to the terminal 15 and the collector electrode of the transistor 21*c* is connected to the terminal 13.

As in the above described embodiments the absence of the control signal at the terminal 12 causes the transistor 5 to be saturated and the terminals 14 and 15 to be of equal potential, thus leaving the transistors 20*c* and 21*c* biased in a condition such that they present a high impedance between the terminal 13 and the circuit ground. This ensures that the variable impedance circuit 4 shunts little if any of the signal traveling between the terminals 1 and 3 of the signal transmission path. When a control signal is applied to the terminal 12 and the transistor 5 becomes substantially non-conducting the transistors 20*c* and 21*c*, in a manner similar to the transistors in the embodiments depicted in FIGS. 2 and 3, become forwardly biased and present a lower impedance between the terminal 13 and the circuit ground 16 and thus shunt a portion of the signal from the signal transmission path.

Figure 5:
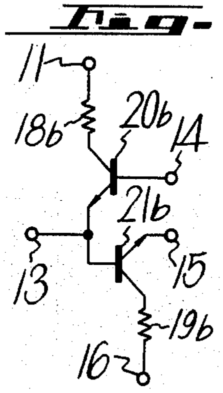

Referring now more particularly to FIG. 5 still another portion of an embodiment according to the invention suitable for use in the circuit of FIG. 1 is shown comprising a PNP transistor 20*b* having its collector lead connected to the terminal 11 through a resistor 18*b* and its emitter electrode connected to the terminal 13. The base electrode of the transistor 20*b* is connected to the terminal 14. The base electrode of an NPN transistor 21*b* is connected to the terminal 13 and its emitter electrode is connected to the terminal 15. The collector electrode of the transistor 21*b* is connected through a resistor 19*b* to the circuit ground 16. As in the embodiments of FIGS. 2, 3, and 4 the transistors 20*b* and 21*b* are caused to vary in their impedance under the direction of a control signal applied to the terminal 12 which puts the transistor 5 into a saturated or unsaturated state.

Figure 6:
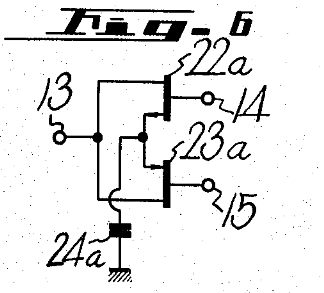

Referring now more particularly to the embodiment depicted in FIG. 6 a field effect (FET) transistor 22*a* has its collector lead connected to the terminal 13 and its base lead connected to the terminal 14. Its emitter lead is connected in series with a capacitor 24*a* to the circuit ground. The emitter lead is also connected to the emitter of a second field effect transistor 23*a*. The collector of the transistor 23*a* is connected to a terminal 13 and its base is connected to the terminal 15. As in the embodiments of FIGS. 2–5 the transistors 22*a* and 23*a* are caused to be conducting or non-conducting in response to a control signal applied to the base of the transistor 5 and thus to vary the shunt impedance between the terminal 13 and the circuit ground.

Figure 7:
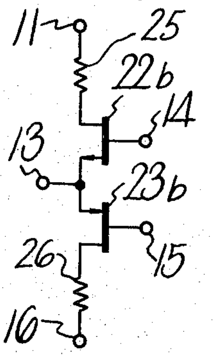

Referring now more particularly to FIG. 7 a field effect transistor 22*b* has its collector lead connected to the terminal 11 through a resistor 25 and its emitter connected to the terminal 13. Its base is connected to the terminal 14. The emitter of a second FET 23*b* is connected to the terminal 13, its base is connected to the terminal 15, and its collector is connected to the circuit ground 16 through a resistor 26. In operation the embodiment of FIG. 7 is similar to the circuit described in reference to FIG. 3.

Figure 8:
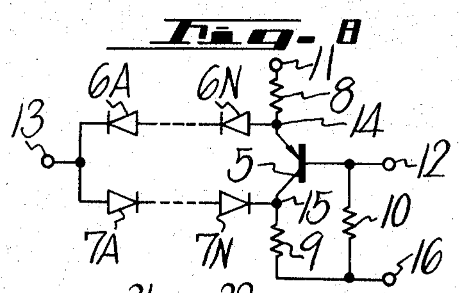

Referring now more particularly to FIG. 8 the embodiment of FIG. 1 is modified to include a plurality of semiconductor diodes 6A to 6N, inclusive, where N is a positive integer to indicate an indefinite number of diodes, which are connected in series with the same polarity in place of the diode 6 of the embodiment of FIG. 1. Similarly, an indefinite number of series connected diodes 7A–7N, inclusive, having the same polarity, are connected in place of the diode 7 of the embodiment of FIG. 1. In other respects the circuit of FIG. 8 operates in substantially the same manner as the circuit depicted in FIG. 1.

Figure 9:
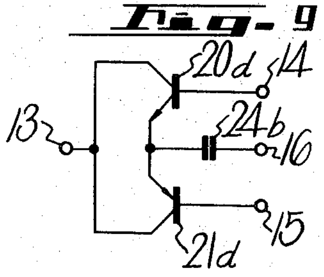

Referring now more particularly to FIG. 9 another portion of an embodiment according to the invention for use in the circuit depicted in FIG. 1 is shown having an NPN transistor 20*d* connected with its collector electrode in contact with the terminal 13 and its emitter electrode connected to the emitter electrode of a PNP transistor 21*d* and to one lead of a capacitor 24*b*. The other lead of the capacitor 24*b* is connected to the terminal 16. The base of the transistor 20*d* is connected to the terminal 14 and the base of the transistor 21*d* is connected to the terminal 15. The collector of the transistor 21*d* is connected to the terminal 13. As in the above described embodiments the transistors 20*d* and 21*d* are caused to become greater or less in their impedances with respect to the circuit ground to vary the impedance of the shunt circuit 4 in response to the control signal applied to terminal 12.

Figure 10:
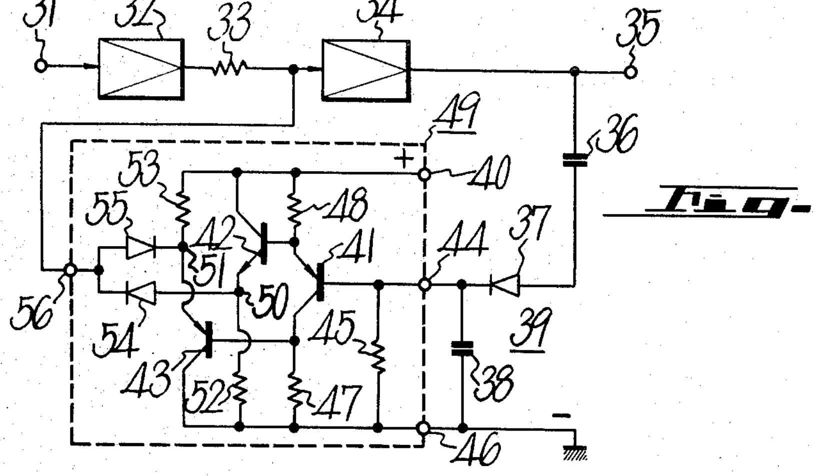
FIG. 10 is a schematic diagram of still another embodiment of the invention as used in an automatic gain control circuit.

Referring now more particularly to FIG. 10 an example is shown using the invention in an automatic gain control circuit. The signal whose amplitude to be controlled is applied to an input terminal 31 and is amplified by a preamplifier 32 and passed through a resistor 33 to the input of a main amplifier 34 whose output appears at the terminal 35. The input of the amplifier 34 is also connected to a terminal 56 of a variable impedance shunt circuit 49. A portion of the output from the amplifier 34 at the terminal 35 is returned to the variable impedance shunt circuit 49 by means of a rectifying circuit 39. The rectifying circuit 39 includes a capacitor 36 connected between the terminal 35 and the anode of a diode 37. The cathode of the diode 37 is connected to an input terminal 44 of the circuit 49. A capacitor 38 is connected between the terminals 44 and a circuit ground 46.

A PNP type transistor 41 is controlled by the signal passing from the rectifying circuit 39. The base of the transistor 41 is connected to the terminal 44 and is also connected in series with a resistor 45 to the circuit ground 46. The emitter of the transistor 44 is connected to a terminal 40 through a resistor 48. A DC power source, such as source 17, is connected with its positive terminal to the terminal 40 and its negative terminal to the circuit ground 46. The collector of the transistor 41 is connected to the base of a PNP transistor 43 and, in series with a resistor 47, to the circuit ground 46. The resistors 47 and 48 are substantially equal in resistive value.

The base of an NPN transistor 42 is connected to the emitter electrode of the transistor 41. The collector of the transistor 42 is connected to the terminal 40. The emitter of the transistor 42 is connected to a terminal 50 and, in series with a resistor 52, to the circuit ground 46. The emitter of the transistor 43 is connected to a terminal 51, to the cathode of a semiconductor diode 55, and, in series with a resistor 53, to the terminal 40. The resistors 52 and 53 are substantially equal in resistive value.

The anode of a semiconductor diode 54 is connected to the terminal 50 and its cathode is connected to the terminal 56. The anode of the diode 55 is connected to the terminal 56. The collector of the transistor 43 is connected to the circuit ground 46.

The transistors 42 and 43 are operated as emitter followers. When the signal transmitting line, consisting of the pre-amplifier 32, the resistor 33 and the main amplifier 34, transmits no signal, the rectifying circuit 39 does not produce a control signal to be supplied to the transistor 41 through the terminal 44. In this situation the transistor 41 operates with a saturation current in its emitter-collector circuit and the voltage difference between its emitter and the collector electrodes is negligible. Since the resistance values of the transistors 47 and 48 are selected to be substantially the same the voltage with respect to the circuit ground 46 of both the emitter and the collector electrodes of the transistor 41 therefore becomes approximately one-half of the voltage from the DC power source applied between the terminals 40 and 46.

With this voltage applied to their base electrodes, the transistors 42 and 43 also operate with saturation current flowing between their collector and emitter electrodes. The potential with respect to the circuit ground at the terminal 50 then becomes one-half of the source voltage minus the voltage between the base-emitter junction of the transistor 42. The potential at the terminal 51 with respect to the circuit ground becomes equal to one-half of the source voltage plus the voltage across the base-emitter junction of the transistor 43. This means that a reverse bias is applied to the diodes 54 and 55, putting them in their high impedance condition. The potential with respect to the circuit ground at the connection point 56 between the two diodes 54 and 55 becomes equal to one-half of the voltage supplied by the DC power source due to the fact that the diodes are selected to have the same characteristics.

When the signal to be controlled is supplied to the input terminal 31 and is amplified by the amplifiers 32 and 34 the rectifying circuit 39 produces a rectified control signal representative in amplitude of the amplitude of the signal appearing at the output terminal 35. The control signal is supplied to the base of the transistor 41 to bias it in such a manner that the collector current is decreased and the collector potential is lowered. Simultaneously the emitter potential of the transistor 41 is raised with a result that the voltage potential with respect to the circuit ground at the connection point 50 is raised while the potential with respect to the circuit ground at the connection point 51 is lowered.

This condition at the terminals 50 and 51 forwardly biases the diodes 54 and 55 and lowers their impedances to the incoming shunt signal applied at the terminal 56 from the input of the amplifier 34. Thus a portion of the signal applied to the input of the amplifier 34 is shunted through the variable impedance circuit 49 in proportion to the amplitude of the control signal applied by the rectifying circuit 39. Together the resistor 33 and the variable impedance circuit 49 constitute a voltage dividing network. Since the variation in impedance of the diodes 54 and 55 is inversely proportional to the amplitude of the signal supplied by the rectifying circuit 39 and the amplitude of the control signal is directly proportional to the amplitude of the output signal at the terminal 35, the output signal is maintained substantially constant by the variable impedance circuit 49 and the rectifying circuit 39.

In the embodiment depicted in FIG. 10 the potentials at the points 50 and 51 with respect to the circuit ground change oppositely by the same amount when the control signal is applied between the terminals 44 and the circuit ground 46 and thus the direct current potential at the terminal 56 is held substantially constant at one-half the voltage of the DC power source supplied between the terminals 40 and 46, irrespective of the level of the control signal applied at the terminal 44.

Furthermore since the diodes 54 and 55 are connected in parallel and with opposite polarities between the input side of the main amplifier 34 and the circuit ground their non-linear characteristics cancel each other. This results in substantially no distortion in the controlled output signals appearing at the terminal 35.

Because the transistors 42 and 43 are operated in the emitter follower configuration their output impedances are extremely low and the impedance variation of the circuit 49 is due substantially only to the impedance variations in the diodes 54 and 55. For this reason the variable impedance circuit 49 operates over a broad range when used as an automatic gain control circuit.

It should be apparent that in all of the above embodiments that a plurality of semiconductor devices may be connected in substitution for any particular semiconductor device, as was done for example, in the embodiment of FIG. 8 with respect to the embodiment of FIG. 1. Furthermore it should be apparent to those skilled in the art that the circuits may be integrated.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. An amplitude control circuit comprising a signal transmission path having input and output terminals and a circuit ground, and means for providing a variable impedance shunt path between the input and output terminals of the transmission path and the circuit ground, the shunt path means including a first semiconductor device having first, second and third electrodes, a D.C. power source having first and second terminals, the second terminal being connected to the circuit ground, a first resistive element connected between the first electrode and the first terminal of the D.C. power source and a second resistive element connected between the second electrode and the circuit ground, the first and second resistive elements having substantially equal resistance values, at least a second and a third semiconductor device series connected between the first and the second electrodes of the first semiconductor device, each of the second and the third semiconductor devices having a junction of P-type and N-type semiconductor regions therein with the P-type region of one of the second and the third semiconductor devices being connected to the N-type region of the other of the second and the third semiconductor devices, means for connecting a point in the signal transmission path between the input and output terminals with a point between the series connected second and third semiconductor devices, and means for supplying a control signal to the third electrode to cause the first semiconductor device to be selectively saturated and unsaturated in response to variations of the control signal.

2. An amplitude control circuit as recited in claim 1, wherein the second and the third semiconductor devices comprise diodes.

3. An amplitude control circuit as recited in claim 1, wherein the second and the third semiconductor devices comprise a plurality of transistors, each transistor having at least one of its junctions connected in series with a junction of the opposite polarity of another of the transistors.

4. An amplitude control circuit as recited in claim 1, wherein the second and the third semiconductor devices comprise field effect transistors connected in series.

5. An amplitude control circuit as recited in claim 1, further comprising biasing means connected to the third electrode of the first semiconductor devive to maintain it in a saturated current condition in the absence of a control signal.

6. An amplitude control circuit as recited in claim 5, wherein the first semiconductor device is a transistor having base, emitter and collector electrodes, and the biasing means includes a third resistive element connected to the base of the transistor for biasing it to operate with a saturation current between its emitter and collector electrodes when no control signal is applied to the base electrode.

7. An amplitude control circuit as recited in claim 6, wherein the second and the third semiconductor devices comprise diodes connected in series with the same polarity direction and the emitter of the transistor is connected through the series connected diodes to the collector of the transistor.

8. An amplitude control circuit comprising:

a. a signal transmission path having input and output terminals, b. a source of direct current, c. first and second resistors, d. a first transistor having base, emitter and collector electrodes, each being connected with a separate end of the D.C. power source through one of the first and the second resistors, e. a control signal input terminal connected to the base of the first transistor, f. a second transistor connected with the emitter of the first transistor and a third transistor connected with the collector of the first transistor, means for biasing each of the second and the third transistors to operate in the emitter follower configuration, g. a plurality of series-connected semiconductor elements connected with the same polarity direction between the emitters of the second and the third transistors, each of the elements having a junction of P-type and N-type semiconductor regions therein, and h. a connecting point between the series connected semiconductor elements and means for connecting the point with the signal transmission path between the input and the output terminals.

9. An amplitude control circuit as recited in claim 8, further comprising means responsive to the signal at the output terminal of the signal transmission path for feeding a control signal to the control signal input terminal.

10. An amplitude control circuit as recited in claim 9, further comprising means for biasing the first transistor to maintain it in a saturated current condition in the absence of a control signal and wherein the feeding means includes a rectifying circuit for producing a control signal in response to the output signal and for applying the control signal to the control signal input terminal.

* * * * *